Feb. 20, 1934.                M. M. BRODERSEN                    1,947,640
                            EARTH WORKING IMPLEMENT
                             Filed June 20, 1932           3 Sheets-Sheet 1
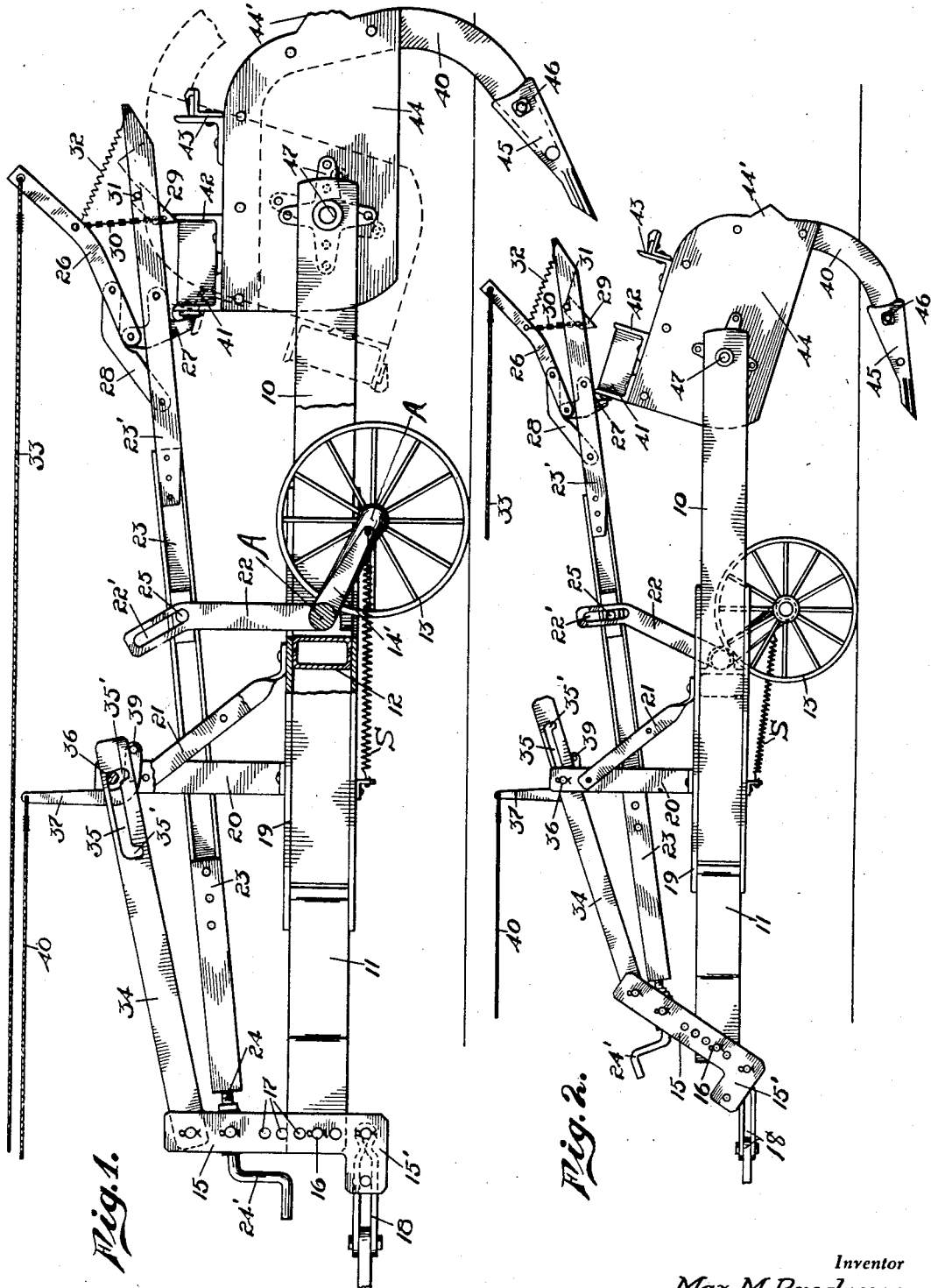
Inventor
Max M. Brodersen
By
Attorney

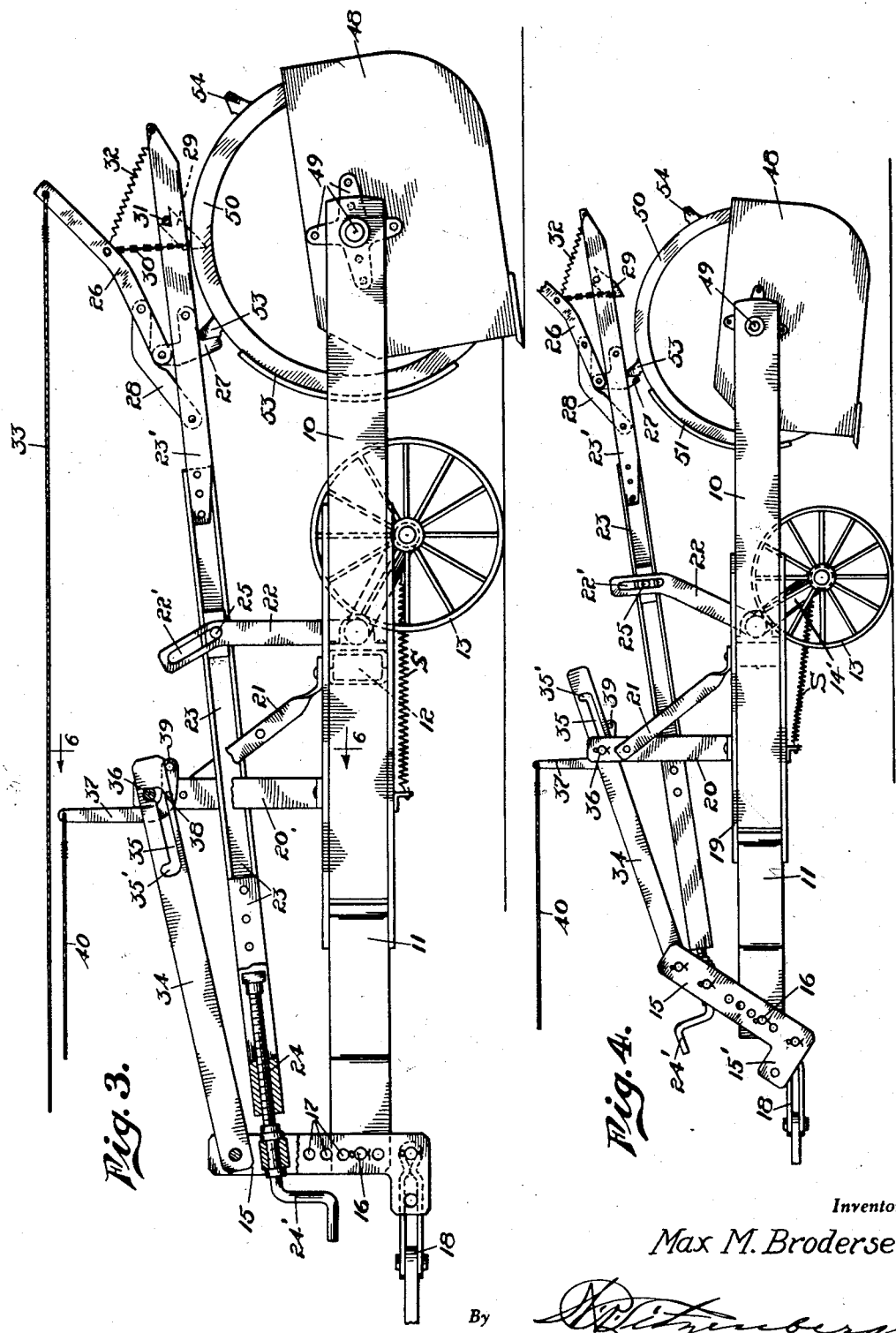

Feb. 20, 1934.     M. M. BRODERSEN     1,947,640
EARTH WORKING IMPLEMENT
Filed June 20, 1932     3 Sheets-Sheet 3
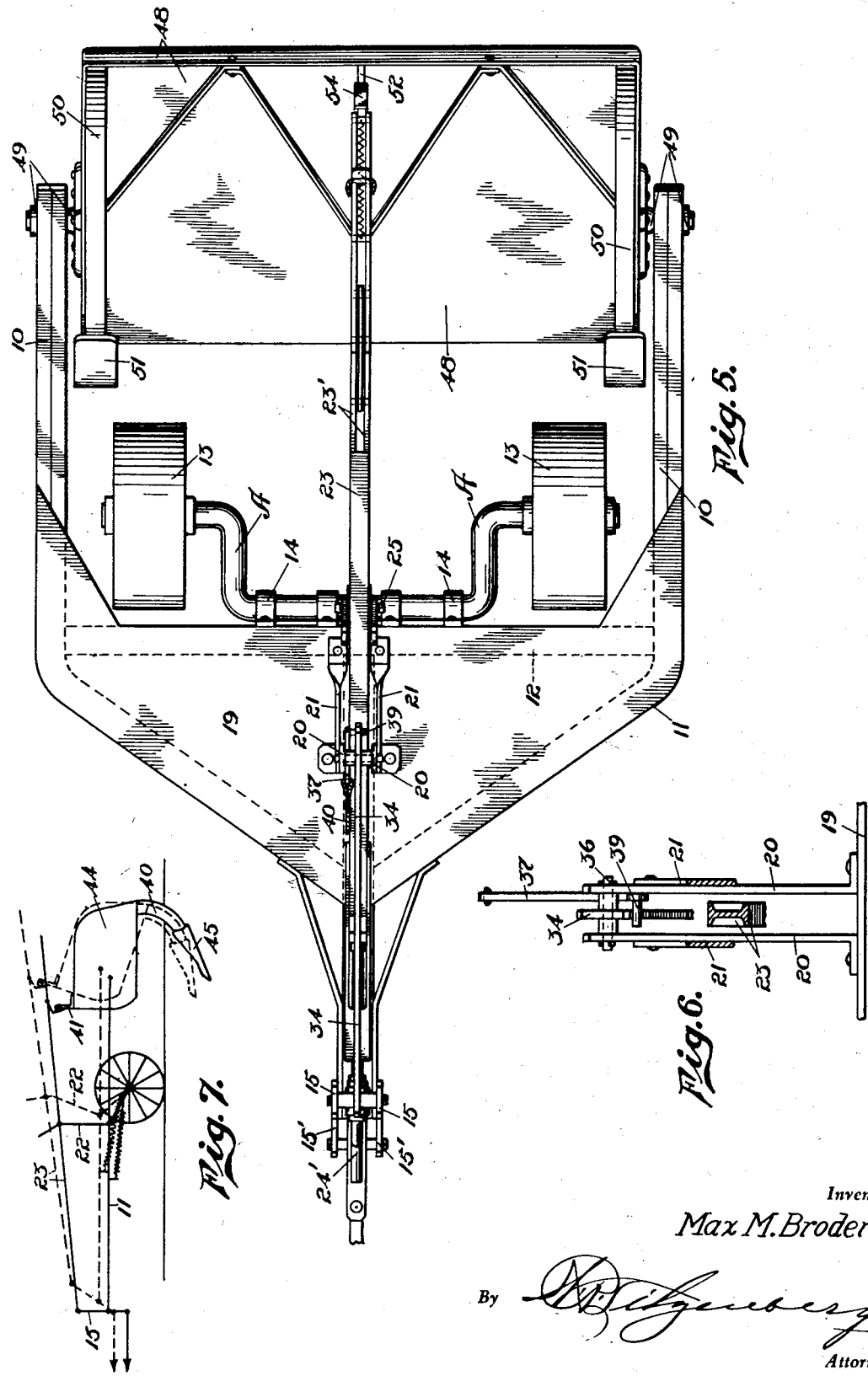
Inventor
*Max M. Brodersen*
By 
Attorney Patented Feb. 20, 1934

1,947,640

UNITED STATES PATENT OFFICE 1,947,640

EARTH WORKING IMPLEMENT

Max M. Brodersen, Alhambra, Calif., assignor to George A. Lathrop, Los Angeles, Calif.

Application June 20, 1932. Serial No. 618,263

6 Claims. (Cl. 97—75)

REISSUED

My invention relates to earth working implements of the wheeled type adapted to be pulled over the surface being worked and having means for digging up the earth, scraping it up and transferring it from place to place, or otherwise cultivating or working it.

Among the salient objects of my invention are: to provide an implement structure having a body frame with carrier wheels and designed to have earth working implements of different kinds interchangeably mounted therein; to provide a mechanism in which the body frame can be adjusted relative to the wheels in operation for the purpose of manipulating or controlling the earth working implement carried thereby; to provide a draft mechanism with connections therefrom for moving said body frame relative to said carrier wheels during the operation of said implement; to provide in such an apparatus a construction and arrangement that the earth working implement will be moved in the earth with a hitching action which renders it more efficient. Other objects and advantages will appear from the following description of one embodiment of my invention shown on the accompanying three sheets of drawings in which:

Figure 1 is a side elevation of an earth working implement embodying my invention, showing a digging implement in place;

Figure 2 is a similar view showing the levers and links in their extreme positions under full strain;

Figure 3 is a view similar to that shown in Fig. 1, but showing a scraper substituted for the digging implement;

Figure 4 is a view similar to Fig. 2, with the scraper raised;

Figure 5 is a plan view of the mechanism shown in Fig. 3;

Figure 6 is a sectional view taken on the line 6—6 of Fig. 3; and

Figure 7 is an outline showing in full lines and in light broken lines, respectively, two positions of the implement as illustrated in Figs. 1 and 2.

Referring now in detail to the drawings, my invention as here embodied for explanatory purposes comprises two side frame members 10, 10, brought together at their forward ends, as at 11, and having a cross beam or member 12, from one side to the other. Two wheels, 13, 13, have therebetween an arched axle A, having its bearings, as 14, 14, on the cross member 12, as will be seen in Fig. 5.

At the forward end of said carrier frame is a vertical lever 15, pivotally connected to said frame at 16, and provided with a series of holes 17, for vertical adjustment of said lever on said frame, the lower end of the lever being of angle form, as at 15' and having secured thereto a pull link or coupling means, designated as a whole 18. Said vertical lever is formed of two spaced side members, as will be understood from Fig. 5. A platform or cover plate 19 is shown mounted on said carrier frame from the cross member 12 forwardly to the juncture of said side members, as seen in Fig. 5. Upon said platform is a standard 20, with brace 21, said standard being formed of two spaced members with a brace for each, as seen in said Fig. 5.

Secured to the arched axle A is a lever 22, having its upper end bent and provided with a slot 22'. This lever 22 is also formed by two spaced members.

Movably mounted in the vertical standard 20 is a long operating link or member 23, connected adjustably by means of a screw 24, to the vertical lever 15, above the pivotal connection at 16, said screw having a crank 24' for operating it. At the vertical lever 22, said link or member 23 is connected by means of a through pin 25, in the slot 22' of said lever 22. The rear end of said long link or member 23, which is composed of two spaced members at 23', is provided with a tripping and holding mechanism consisting of a lever 26, pivotally connected at its lower end to a stop member 27, which is in turn pivotally connected to said member 23', as clearly indicated. A link 28 is pivotally connected with the lever 26 and to the member 23', as shown. A rear stop member 29, supported by a chain 30 from the lever 26, rests between the members 23' of the member 23, with its upper end bifurcated and bearing against a pin 31 through said members 23', as shown. A second spring 32 is attached to said lever 26 and to the end of the member 23', and a pull cable 33 is attached to the upper end of the lever 26 and extended forwardly to the operator. The link or member 23, it will be seen, is adapted to be moved rearwardly endwise when the vertical lever 15 is rocked rearwardly, as seen in Figs. 2 and 4, and in the diagrammatic view shown in Fig. 7.

Before this endwise movement of this long link or member 23 can be accomplished, however, there must be a release of a tripping mechanism which I will now describe. Connected to the upper end of the vertical link 15, is a member 34, the rear end of which is provided with a longitudinally extending slot 35, the opposite ends of which slot are turned downwardly, as at 35'.

This slot has a through pin 36, in the upper end of the vertical standard 20, therethrough. In Figs. 3 and 4, this member 34 is reversed, it will be noted so that the ends of the slot 35 are turned upwardly, instead of downwardly, as in Figs. 1 and 2. The reason for this will be described later in this specification. Pivoted to the upper end of said vertical standard 20, is an angle lever 37, pivoted at its angle at 38, and provided in its end or toe with a pin 39, positioned to engage under the end of the member 34. The upper end of said angle lever 37 has attached thereto a pu'l cable 40, whereby it can be rocked on its pivot mounting to raise its toe and the pin 39 therein to engage and raise the end of the member 34 to move the slot end 35' over the stop pin 36, and thus prevent endwise movement of said member 34, and also to prevent the rearward movement of the vertical member 15. The weight of the end of the member 34 normally holds the angle lever 37 in its upright position as seen in Figs. 1 and 2. In Figs. 3 and 4, said angle lever 37 is pulled to raise the end of the member 34 and thus to release it so it can be moved rearwardly with the slot 35 moving on the pin 36.

With the mechanism thus far described, it will be seen that pull on the vertical member 15, may be direct on the frame member 11 without any rearward thrust of the member 23, as in the positions shown in Figs. 1 and 3, or with the thrust movement permitted, as in positions shown in Figs. 2 and 4. The rearward thrust movement of said member 23, operates to move the vertical lever 22 rearwardly, and inasmuch as this is secured to the arch axle A, the action is to raise the frame members 10, as indicated in the light broken lines in Fig. 7.

I will now describe the two kinds of implements which can be secured to the rear ends of the frame members 10, 10, one implement, Figs. 1 and 2, being digger prongs, and the other, Figs. 3 and 4, being a scraper, both implements having stops for cooperation with the stop mechanism on the end of the long member 23.

Referring first to Figs. 1 and 2, in which a digging mechanism is shown, there is a series of yoke members or arms, as 40, spaced apart and secured at their top sides to angle members, as 41 and 42, and also 43, extended crosswise from one side to the other of said mechanism, and with plates, as 44 secured thereto, and by means of which said digging mechanism is pivotally mounted in the ends of the two side members 10, 10, for revolving movement, as indicated by the light broken lines in Fig. 1. Each of said arms is provided with a digging point or shoe 45, telescoped thereon and secured by means of through bolts 46. The plates are formed with rearwardly projecting points, as 44', to catch in the ground when said device is turned over and to cause it to turn instead of sliding. The pivotal connections at the opposite ends of said digging mechanism, designated 47, permits said digging device to rotate between the ends of the frame members 10, 10, as will be understood from the showing. The cross members 41, 42 and 43, across the top of said mechanism form stops to be engaged by the dogs or pawls 27 and 29, and the operation of which will be described later in this specification.

Referring to Figs. 3 and 4, in which a scraper mechanism is shown, the scraper bowl is designated 48, pivotally connected at its opposite ends, as at 49, between the ends of said frame members 10, 10, in the same manner as said digging mechanism is mounted. These mechanisms or implements can be interchanged one for the other between the ends of said frame members 10, 10, as may be desired. Said scraper bowl 48 has at its opposite ends, arch members, as 50, with slide shoes 51 around their forward sides, as shown. In the middle of said bowl is an arched member 52, provided with two stops 53 and 54 to be engaged by the dogs or pawls 27 and 29 at different times in the operation of said mechanism, as said bowl is turned on its pivotal mountings 49, under the rearwardly extending long member 23. In Figs. 3 and 4, which are side elevations, the end arched members 50 only are seen, but in Fig. 5, the middle arched member 52 can be seen, and inasmuch as it is in the middle of the bowl, it has no slide shoe. The operation of this device will be described later herein.

It will thus be seen that I have provided an earth working mechanism in which there is a body frame or structure, 10, 10, with carrier wheels 13, 13, and with a coupling mechanism which includes a pivoted member 15, with coupler 18 therefor, and a longitudinal thrust member 23; that there is an earth working implement, 44 in one case, and 48 in another case, interchangeable in said body frame; that there is a supporting connection between the carrier wheels 13, and the body frame 10, whereby one can be moved relative to the other, and that this is actuated by the longitudinal thrust member 23. I have also provided a spring S, connected with the underside of the frame member 10, and at its other end connected to an arm 14' on the arch axle A, whereby said body frame and said wheels are held normally and yieldingly in one position and their relative movements are against the tension fo said spring S. The relative movement between the longitudinal thrust member 23 and the body frame 10, can be prevented by adjustment of the link or member 34, to interlock it with a pin 36 on the fixed vertical standard 20, where it is desired to prevent such relative movement.

The use and operation of the apparatus may be briefly described as follows:

Referring first to Figs. 1 and 2, with the parts in the positions shown in full lines, if power is attached to the coupling means at 18, the digging points 45 will be thrust into and through the earth as said apparatus is pulled over the surface thereof. With the link or member 34 in the position shown, it is free to move back and forth longitudinally. With the parts in these positions, as said implement moves through the earth there will be set up a slight rocking movement of the implement on its pivotal mounting, the resistance causing the vertical draft member 15 to start to move to the position shown in Fig. 2, and then as the longitudinal thrust member 23 is moved rearwardly it tends to rock the implement rearwardly by pressure against the top thereof through the pawl 27, while the pull through the frame 10, at the pivot 47 of said implement tends to cause the points of the digger, or the edge of the scraper, to be directed upwardly. The spring S, acting on the arch axle A is yieldingly pulling on the arm 14', as the arch axle, with the frame, moves up slightly and back. Thus the implement is caused to move forwardly with a rocking movement as it hitches through the earth. In case an obstruction is engaged by the implement so that the strain on the draft mechanism is greatly increased, then the draft member 15 is forced back to the position shown in Fig. 2, and the implement is rocked, as shown in Figs. 2 and 4, to direct the implement out of the earth, this extra pull also raising the body frame, as will be understood from the diagrammatic view, Fig. 7. The length of the longitudinal thrust member 23 can be adjusted by the screw 24, thus making it possible to regulate the rearward pressure exerted on the top of the implement to resist the forward rocking movement thereof caused by the engaging of the points or edge in the earth. In case it is desired to prevent any rearward movement of the thrust member 23, it is only necessary to pull on the cable 40 and raise the member or link 34, Figs. 1 and 2, to interlock said member against end movement by causing the angle part of the slot, 35', to engage with the pin 36, as will be clear from said views. In Figs. 3 and 4, where the scraper is shown as the implement, said member 34 is reversed, and it is normally interlocked to hold the scraper in the earth, but should it strike an obstruction, by pulling the cable 40, the member 34 can be released, and the movement indicated in Fig. 4 will result and the scraper will be raised out of the earth.

Thus I have provided an earth working implement which is more effective as it moves through the earth for the reason that it moves with a sort of rocking or hitching movement caused by the pull on the member 10, and the rearward push or thrust on the member 23, acting on the top of the implement, while the points 45, or the scraper edge, are moving through the earth with a hitching movement.

I am aware that many changes can be made in my invention as here illustrated without departing from the spirit thereof, and I do not, therefore, limit the invention to the showing made, except as I may be limited by the hereto appended claims.

I claim:

1. In combination, a body frame, carrier wheels, means pivotally supporting said body frame on said wheels to be moved relative thereto, spring means yieldingly connecting said frame with said carrier wheels, an earth working implement in said frame, supported to be rocked, a draft mechanism at the opposite end of said frame and including a pivoted coupling member for power and a longitudinal thrust member, operating connections between said thrust member and said frame supporting means, operating connections between said thrust member and said implement, whereby the longitudinal movement of said thrust member moves said frame relative to said wheels and said implement relative to said frame, and means whereby pull on said draft mechanism and said frame exerts rearward thrust on said thrust member.

2. In combination, a body frame, carrier wheels, means adjustably supporting said body frame on said wheels to be moved relative thereto, an implement in said frame, supported to be rocked, a draft mechanism at the opposite end of said frame and including a coupling means for power and a longitudinal thrust member, operating connections between said thrust member and said frame supporting means, operating connections between said thrust member and said implement, whereby the longitudinal movement of said thrust member moves said frame relative to said wheels and said implement relative to said frame, and means whereby pull on said draft mechanism and said frame exerts rearward thrust on said thrust member.

3. In an earth working implement, a body frame, carrier wheels, means supporting said body frame on said wheels to be raised relative thereto, draft mechanism at the forward end of said frame and movable relative thereto, an earth working implement at the rear end of said frame, operating connections between said draft mechanism, said earth working implement, and said body frame supporting means, whereby pull on said draft mechanism operates to raise said body frame relative to said wheels and to rock said implement simultaneously, and means for rendering said operating connections inoperative.

4. In combination, a body frame, carrier wheels, means adjustably supporting said body frame on said wheels to be moved relative thereto, an implement in said frame, supported to be rocked, a draft mechanism at the opposite end of said frame and including a coupling means for power and a longitudinal thrust member, operating connections between said thrust member and said frame supporting means, operating connections between said thrust member and said implement, whereby the longitudinal movement of said thrust member moves said frame relative to said wheels and said implement relative to said frame, means whereby pull on said draft mechanism and said frame exerts rearward thrust on said thrust member and said implement, and means for rendering said thrust member inoperative relative to said frame and said implement.

5. In an earth working implement, a carrier frame with wheels, an implement carried by said frame and operable in the earth as said carrier frame is moved over the surface of the earth, means supporting the carrier frame on said wheels for vertical movement of the frame relative to said wheels, said means being an arched axle connected at the top of the arch to said frame, draft mechanism for pulling said structure, said draft mechanism being movable relative to said structure, connections from said draft mechanism including an extension lever from said arched axle for moving said frame relative to said wheels, and a thrust member for rocking said implement simultaneously with the movement of said frame, and means connected with said draft mechanism and manually operable to render said relative movement of said draft mechanism inoperative.

6. In an implement of the character referred to, a body frame, carrier wheels therefor, said frame being movable vertically relative to said wheels, draft means for pulling said frame, said draft means being movable relative to said frame, an implement carried by said frame and movable relative thereto, a thrust member from said draft means to said implement and to the frame connections with said wheels, whereby pull on said draft means simultaneously moves said implement relative to said frame and moves said frame relative to said wheels, and means operable manually for rendering the draft means rigid relative to said frame at will.

MAX M. BRODERSEN.